Dec. 27, 1938.  I. J. McNAMARA  2,141,818
CLAMP DEVICE
Filed Aug. 25, 1937
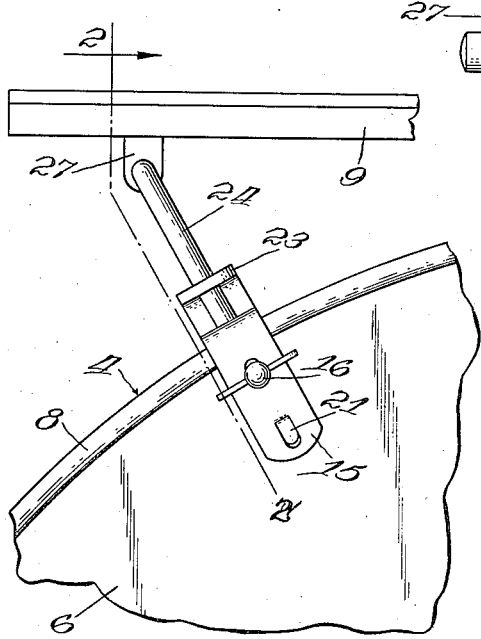
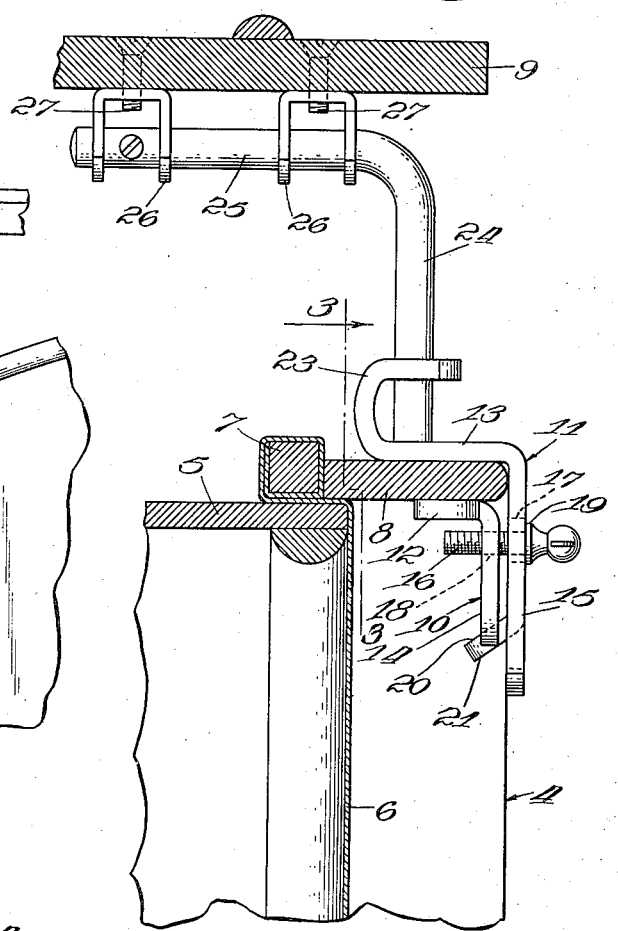
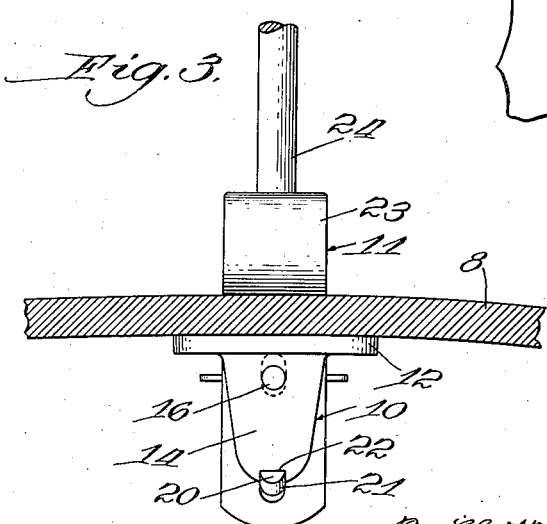
Inventor:
Ignatius J. McNamara
By Chritton, Wiles, Davis, Hirsch & Dawson
Attys.

Patented Dec. 27, 1938

2,141,818

UNITED STATES PATENT OFFICE 2,141,818

CLAMP DEVICE

Ignatius J. McNamara, Chicago, Ill., assignor to Slingerland Banjo & Drum Company, Chicago, Ill., a corporation of Illinois Application August 25, 1937, Serial No. 160,917

2 Claims. (Cl. 24—263)

My invention relates generally to clamp devices, it having been devised for embodiment more especially, though not exclusively, in clamp devices for attachment to the counter-hoops of drums to serve as supports for objects, as for example appurtenances to the drums.

My objects are to provide a novel and simple construction of clamp device which when tightened upon the object to which it is to be attached, will be firmly and positively gripped thereto; to provide a construction whereby the maximum area of contact of the jaws with the object may be effected; and other objects as will be manifest from the following description.

Referring to the accompanying drawing:

Figure 1 is a view in side elevation of a clamp device embodying my invention showing it of a constructoin suitable for supporting a table, shown in edge elevation and partly broken away, above a drum, shown in side elevation and partly broken away, and to which the clamp device is applied.

Figure 2 is an enlarged sectional view taken at the irregular line 2—2 on Fig. 1 and viewed in the direction of the arrow; and Figure 3, a fragmentary sectional view taken at the line 3—3 on Fig. 2 and viewed in the direction of the arrow.

In the particular construction shown 4 represents a well known form of drum, the shell of which is shown at 5; the head, of flexible material, at 6; the flash hoop at 7 and about which the marginal edge portion of the head 6 is wrapped; and the counter hoop, commonly associated with tauntening devices (not shown), at 8. 9 represents a table for support above the drum as commonly provided, my improved clamp device hereinafter described being shown of such construction as to support the table by the use of two of the clamp devices to which the opposite ends of the table are secured, as shown of one end of table in Figs. 1 and 2.

The clamp device shown comprises two angle shaped members 10 and 11 disposed in nested condition whereby the flanges 12 and 13 of these members and also their flanges 14 and 15 are substantially parallel, respectively.

The device is adapted to be clamped at its clamping flanges 12 and 13, which form jaws, over the counter hoop 8, by clamping means comprising a wing-screw 16 extending through, and movable along, a slot 17 elongated lengthwise of the flange 15, and threaded in an opening 18 in the flange 14, the screw 16 bearing at a head 19 thereon against the outer face of the flange 15; these means also comprising a cam surface 20 on the flange 15 along which the adjacent end of the flange 14 moves, for forcing the jaw-flange 12 toward the opposed jaw flange 13 to firmly clamp these jaws against the hoop 8, upon tightening the screw 16, the member 10 in this movement bodily moving toward the interior angle of the member 11 and the screw 16 moving along the slot 17.

The cam surface 20 may be provided in any desirable way. As shown it is formed by partially cutting out a portion of the metal of the flange 15 to form a tongue 21 and deflecting it into a position oblique to the face of the flange 15 as shown.

To prevent rotation of the member 10 the end thereof which engages the cam surface 20 is notched, as represented at 22, to receive the tongue 21.

For serving the particular purpose above described the flange 15 of the clamp device is extended and bent to form a yoke 23 in which the lower end of an angle bar 24 is mounted, its upper horizontal portion 25 carrying a pair of yoke-clips 26 rotatable thereon and supporting the table 9 which is secured to the yokes 26 by screws 27; it being understood that one such clamp device is employed for each end of the table.

The clamp device may be quickly attached to and detached from the object to which it is applied and when positioned for use is positively gripped to the object; the provision of the cam surface 21 and the slot 17 for the screw 16 permitting the jaw flange 12 to automatically adjust itself against the inner surface of the hoop 8 to effect maximum area of contact between these parts.

While I have illustrated and described a particular construction of clamping device embodying my invention and have shown it for use on a particular object and for supporting a particular appurtenance to such object, I do not wish to be understood as intending to limit it thereto as the device shown may be variously modified and altered, and used on other objects and where used as a support for an article may be modified to support other articles than that shown without departing from the spirit of the invention.

What I claim as new and desire to secure by Letters Patent, is:

1. A clamp device comprising nested angle shaped members having opposed flanges, certain of said opposed flanges forming jaws for clamping an object, means engaging the other flanges of said members for effecting relative movement of said members toward each other, and a cam on said last-referred-to flange of the outer one of said members against which the inner one of said members moves when said means are actuated, for effecting relative movement of said jaws toward each other, the inner one of said members having a notch to receive said cam.

2. A clamp device comprising an angle shaped member having flanges, a second member disposed alongside one of the flanges of said first-referred-to member and forming with the other flange thereof clamping portions, means engaging said members for effecting relative movement of said members toward each other in one direction and a cam on one of said members against which the other one of said members moves when said means are actuated for effecting relative movement of said clamping portions toward each other in another direction, the one of said members which engages said cam having a notch to receive said cam.

IGNATIUS J. McNAMARA.